(12) United States Patent
Von Novak et al.

(10) Patent No.: US 8,508,352 B2
(45) Date of Patent: Aug. 13, 2013

(54) HARDWARE CONTINUITY LOOP FOR PREVENTING VEHICLE MISAPPROPRIATION

(75) Inventors: William Von Novak, San Diego, CA (US); Michael Joseph Contour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 12/376,752

(22) PCT Filed: Aug. 31, 2007

(86) PCT No.: PCT/US2007/077354
§ 371 (c)(1),
(2), (4) Date: Feb. 6, 2009

(87) PCT Pub. No.: WO2008/030770
PCT Pub. Date: Mar. 13, 2008

(65) Prior Publication Data
US 2010/0176937 A1   Jul. 15, 2010

Related U.S. Application Data

(60) Provisional application No. 60/843,301, filed on Sep. 7, 2006, provisional application No. 60/843,834, filed on Sep. 11, 2006.

(51) Int. Cl.
*B60Q 1/00* (2006.01)
(52) U.S. Cl.
USPC ..... 340/439; 340/540; 340/426.3; 340/426.1; 340/652; 324/539

(58) Field of Classification Search
USPC ................ 340/426.3, 426.11, 426.12, 426.1, 340/426.5, 429, 438, 439, 426.19, 540, 541, 340/542, 652, 653, 654, 506, 649; 324/539, 324/540, 541
See application file for complete search history.

(56) References Cited

U.S. PATENT DOCUMENTS 3,820,361 A   6/1974   Leitner
4,979,170 A   12/1990   Gilhousen et al.
(Continued)

FOREIGN PATENT DOCUMENTS

WO   WO0296725 A2   12/2002
WO   03098908 A   11/2003
WO   WO2004058549   7/2004

OTHER PUBLICATIONS

International Search Report—PCT/US2007/077354. International Search Authority—European Patent Office. Mar. 3, 2009.
(Continued)

*Primary Examiner* — George Bugg
*Assistant Examiner* — Edny Labbees
(74) *Attorney, Agent, or Firm* — Ashish L. Patel; Gerald P. Joyce, III

(57) ABSTRACT

The specification and drawing figures describe and show a hardware continuity loop that is installable in a vehicle for preventing vehicle misappropriation. In one embodiment, the hardware continuity loop includes a plurality of cables that is operatively connected across selected components of a mobile computing platform, and a relay for controlling vehicle response to an attempted vehicle misappropriation. In another embodiment, the hardware continuity loop includes as detection circuit located in the mobile application server adapted to process a signal on sensing vehicle misappropriation, a plurality of programmable general purpose modules, and one or more low side drivers, for causing a vehicle response to attempted vehicle misappropriation.

18 Claims, 4 Drawing Sheets

(56) References Cited

U.S. PATENT DOCUMENTS

| | | | |
|---|---|---|---|
| 5,889,463 A | 3/1999 | Judd et al. | |
| 5,955,954 A * | 9/1999 | Keller | 340/600 |
| 5,965,954 A * | 10/1999 | Johnson et al. | 307/10.3 |
| 6,043,733 A * | 3/2000 | Lind | 340/426.28 |
| 6,675,089 B2 * | 1/2004 | Hirabayashi et al. | 701/431 |
| 6,741,166 B1 * | 5/2004 | Sanchez | 340/426.34 |
| 7,187,284 B2 * | 3/2007 | Masciantonio | 340/568.2 |
| 2007/0203641 A1 * | 8/2007 | Diaz et al. | 701/208 |

OTHER PUBLICATIONS

Written Opinion of the International Searching Authority—PCT/US2007/077354. International Search Authority—European Patent Office. Mar. 3, 2009.

International Preliminary Report on Patentability—PCT/US2007/077354. International Search Authority—European Patent Office. Mar. 17, 2009.

* cited by examiner

HARDWARE CONTINUITY LOOP FOR PREVENTING VEHICLE MISAPPROPRIATION

CLAIM OF PRIORITY UNDER 35 U.S.C. §119

The present Application for Patent claims priority to Provisional Application No. 60/843,301, entitled "HARDWARE CONTINUITY LOOP" filed Sep. 7, 2006, and also to Provisional Application No. 60/843,834, entitled "HARDWARE CONTINUITY LOOP" filed Sep. 11, 2006; and assigned to the assignee hereof and hereby expressly incorporated by reference herein.

BACKGROUND

1. Field

The apparatus and method disclosed and claimed in this document pertains generally to continuity loops. More particularly, the new and useful embodiments of the continuity loop disclosed and claimed in this document pertain to a hardware continuity loop and a software-assisted hardware continuity loop for preventing unauthorized vehicle misappropriation. The hardware continuity loop is particularly, but not exclusively, useful for disabling operability of a vehicle using a mobile satellite communications system.

2. Background

A system for at least two-way communications between remote computers on a mobile satellite communications system, such as a vehicle dispatcher computer and one or more communications units in a vehicle, is increasingly in demand. Users of such a system desire to track the location of vehicles, communicate with vehicle operators, and monitor various problems affecting vehicle operators. Efforts to locate, track, identify, and communicate with such vehicles has been enhanced by combining the U.S. Global Positioning System with a variety of hardware and software system components.

Demand also has increased for enhanced capabilities of the mobile satellite communications system to include apparatus and features that signal attempted or actual unauthorized vehicle misappropriation. According to the Insurance Information Institute, every 26 seconds a motor vehicle is stolen in the United States. 92 million trucks and truck tractors operate on United States highways. A new Interstate-rated long-haul truck may cost in excess of $100,000 U.S. Accordingly, preventing unauthorized vehicle misappropriation is of concern to vehicle operators, vehicle owners, and insurance companies.

The term "vehicle" as used in this document includes but is not limited to not only ground-based motorized vehicles including trucks, cars, and trains, but also ships, boats, airborne means of transport, and the like. The term "remote" as used in this document means that one object is removed in space from another systemically interrelated but distant object or objects, or that one object has the capability of acting on, controlling, sending data to, or acquiring data from, such other systemically interrelated but distant object or objects, without coming into physical contact with one another.

As indicated, demand has risen for a new, useful and improved mobile satellite communications system with enhanced capabilities for inter-communication among computers and users of a mobile satellite communications system such as Qualcomm Incorporated's OMNIVISION™ system (in this document, "mobile satellite communications system"). The hardware continuity loop disclosed and claimed in this document significantly alters the structure and co-operation of structure used in the mobile components of earlier mobile satellite communications systems, and thereby enhances the capabilities of such a system to counter actual or attempted vehicle misappropriation by providing apparatus not available in current systems.

SUMMARY

Embodiments disclosed herein address the above stated needs by

In one embodiment, the hardware continuity loop includes a vehicle ground located at one end of a power cable system operatively connected across selected components of a mobile computing platform and to a relay for controlling vehicle response to an attempted vehicle misappropriation. In another embodiment, the hardware continuity loop includes a detection circuit located in the mobile application server adapted to process a signal on sensing vehicle misappropriation.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the hardware continuity loop will become apparent to those skilled in the art when read in conjunction with the following description, drawing figures, and appended claims.

The foregoing has outlined broadly the more important features of the invention to better understand the detailed description that follows, and to better understand the contributions to the art. The hardware continuity loop is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the hardware continuity loop, which is measured by the claims, nor intended to limit the scope of the claims.

The novel features of the hardware continuity loop are best understood from the accompanying drawing, considered in connection with the accompanying description of the drawing, in which similar reference characters refer to similar parts, and in which:

Figure 1:
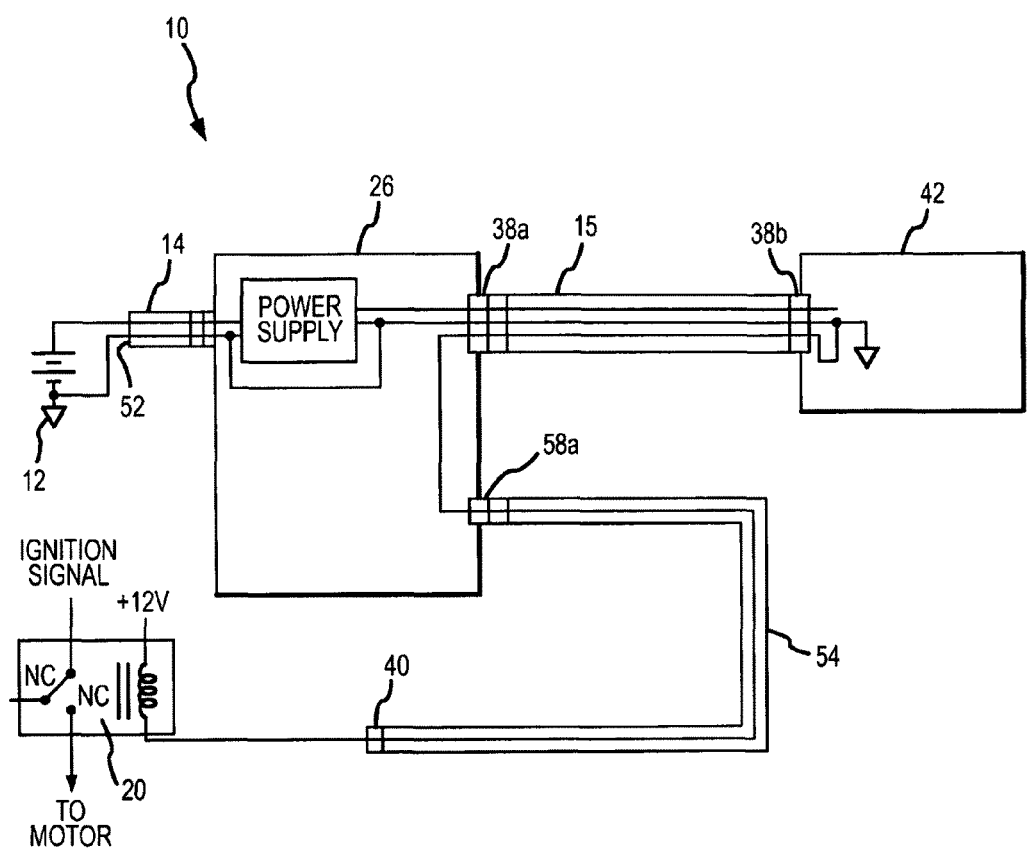
FIG. 1 of the drawing is a schematic illustration of one embodiment of a hardware continuity loop.

To the extent that subscripts to the numerical designations include the lower case letter "n," as in "a-n," the letter "n" is intended to express repetitions of the element designated by that numerical reference and subscripts.

DETAILED DESCRIPTION

As shown in FIGS. 1-4, a hardware continuity loop 10 is provided that in its broadest context includes a vehicle ground 12 located at one end of a power cable 14 adapted to be operatively connected across selected components 16 of a mobile computing platform 18. Hardware continuity loop 10 also includes a satellite data modem cable 15, as well as an accessory cable 54. A relay 20 is provided for controlling vehicle response to an attempted misappropriation of vehicle 22. In another embodiment, the hardware continuity loop 10' also includes a detection circuit 24 located in a mobile application server 26 of the mobile computing platform 18 to process a signal on sensing vehicle misappropriation, and a plurality of programmable general purpose modules 28a-n for causing a vehicle response to attempted vehicle misappropriation.

Figure 3:
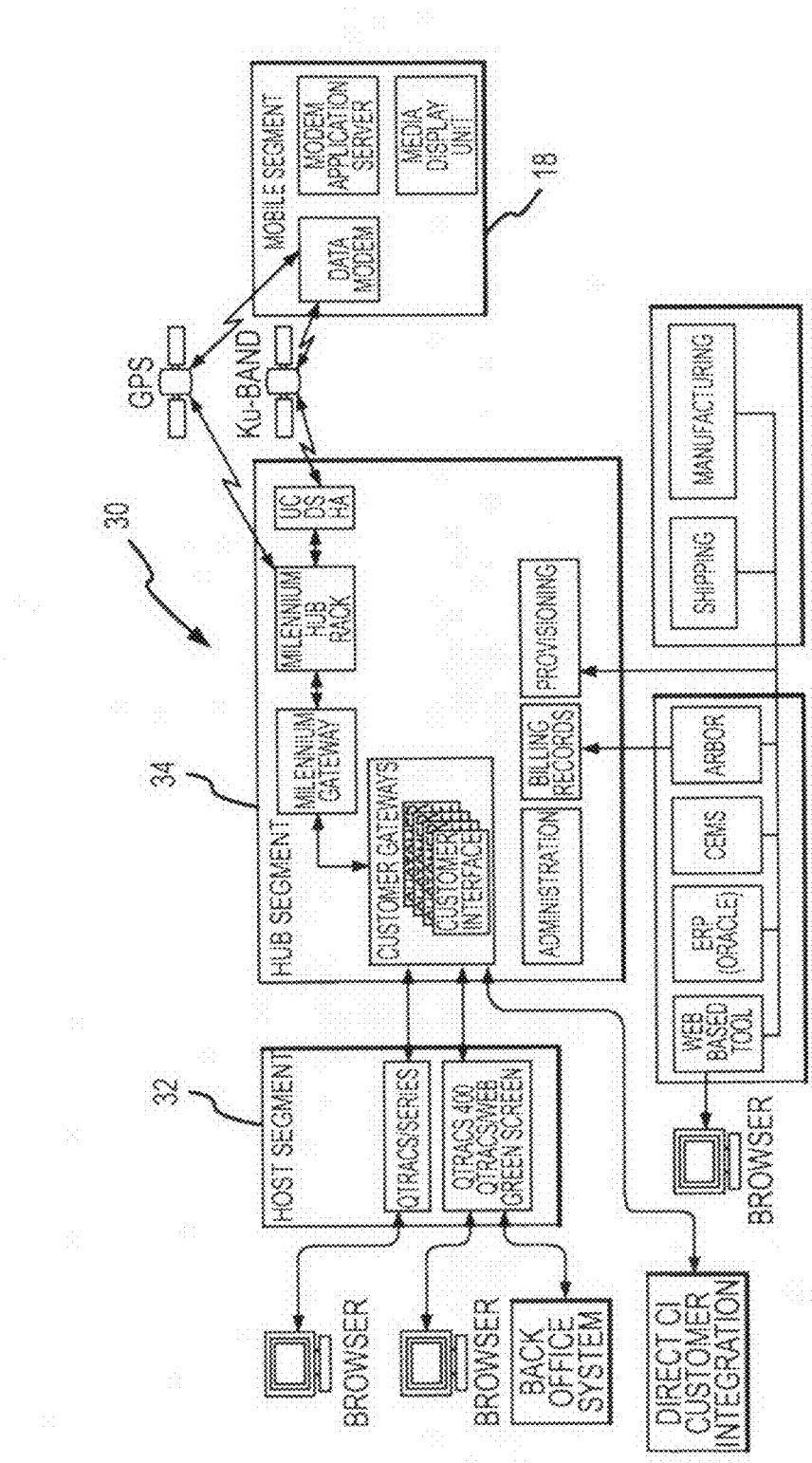
FIG. 3 is a block diagram illustrating the mobile satellite communications system.
Figure 4:
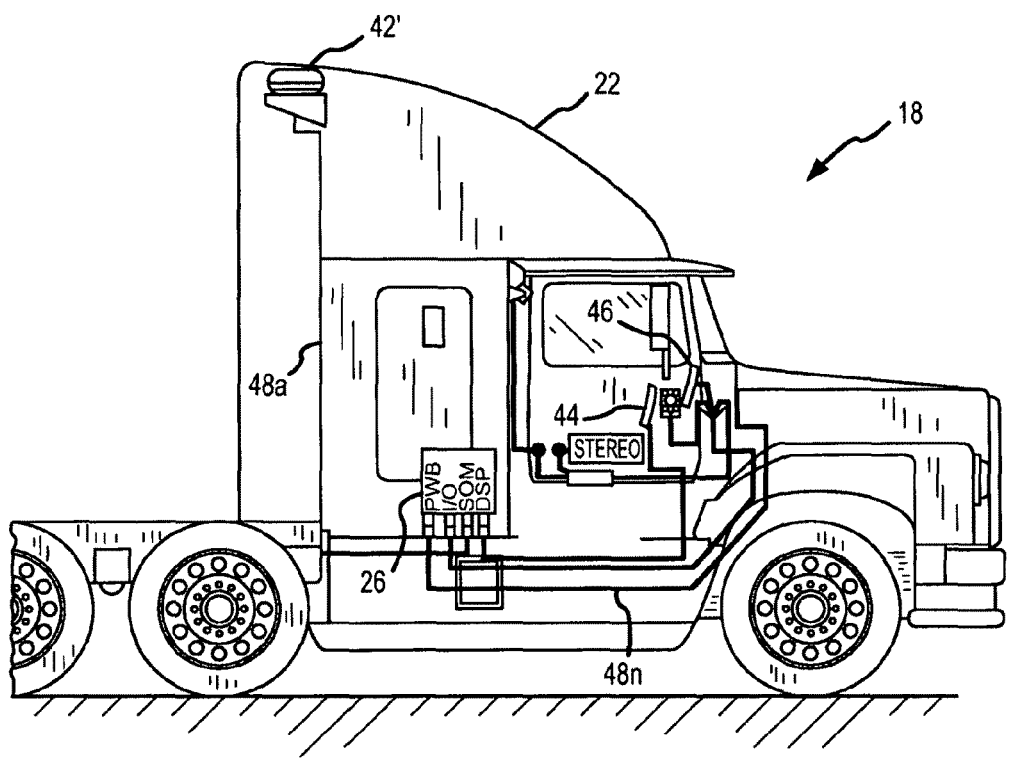
FIG. 4 is a side perspective illustrating the mobile computing platform components on a vehicle.

To place the embodiments of hardware continuity loops 10 in their operational context and environment, FIG. 3 is an illustration of a mobile satellite communications system 30. As shown, FIG. 3 includes at least one customer dispatch computer 32, a variety of hardware and software components operatively connected to (i) the customer dispatch computer 32, an earth station 34, a satellite 36, and to a vehicle 22 as shown in FIG. 4. Mobile satellite communications system 30 is designed to enable users of the system to communicate with vehicles, determine vehicle location, track vehicles, and allow a variety of communications among a dispatcher, an operator and passenger of a vehicle, and authorized third parties outside the system, among other capabilities.

Referring now to FIG. 4, a number of unique, novel and useful components of a mobile computing platform 18 are illustrated. The mobile computing platform 18 is part of the mobile satellite communications system 30 illustrated in FIG. 3. The term "mobile computing platform" is used in this document to refer to selected communication apparatus located on or in the vehicle 22 as shown in FIG. 4. For purposes of this document, therefore, "mobile computing platform" includes selected mobile, as opposed to comparatively stationary, components of the mobile satellite communications system 30 shown in FIG. 3. Accordingly, as shown, mobile computing platform 18 includes (i) a mobile applications server 26, (ii) a satellite data modem 42 shown in FIG. 4 as mounted on vehicle 22, (iii) a media display unit 44 as a primary means of communication between an operator of a vehicle 22 and at least one other remote computer station such as a vehicle dispatcher 32, (iv) a compact display unit 46 that is a secondary means of communication enabling an operator of a vehicle 22 to communicate at least between vehicle 22 and at least one other remote computer station such as a vehicle dispatcher 32, and (v) a plurality of cables 48a-n shown diagrammatically in FIG. 4 associated with those components.

As indicated, in addition to communications by and between a vehicle operator and a dispatcher, owners of vehicles are eager to reduce losses accompanying unauthorized misappropriation of either a vehicle or associated equipment such as components of the mobile computing platform—in a word, theft. The hardware continuity loop 10 disclosed and claimed in this document overcomes limitations of previous efforts to preclude vehicle and associated hardware misappropriation. As used in this document the term "continuity" means the state of being continuous, as when an electric circuit is uninterrupted. With the continuity loop 10 the primary concern is whether there is an open or closed circuit. As is well known by those skilled in the art, tests and testers have been formulated to check an electric circuit to determine if current flows in a complete circuit. The hardware continuity loop 10 creates an activated circuit that if interrupted by efforts to misappropriate the vehicle 22 will deactivate hardware continuity loop 10 and disable operability of vehicle 22. These features and capabilities currently are unavailable to the industry.

More specifically, to terminate vehicle tracking capabilities of earlier systems, thieves would sever the cable or cables between an on-board receiver/transmitter, such as an antenna control unit (not shown) mounted on the exterior of a vehicle 22 and perhaps other components of a mobile communications terminal (not shown) to disable vehicle tracking capabilities of mobile satellite communications system 30. Alternatively, an on-board receiver/transmitter 42 mountable on the exterior of vehicle 22 and also operatively connected to other components of the mobile computing platform 18 via one or more threaded connectors could be detached by thieves who discovered such an action would disable vehicle tracking capabilities.

By directing the hardware continuity loop 10 through selected mobile computing platform 18 components—but not through the media display unit 44—those limitations are overcome. Hardware continuity loop 10 is not routed through the media display unit 44 because the media display unit 44 is not essential for the mobile computing platform 18 to perform vehicle tracking and messaging functions.

As shown in FIG. 1, hardware continuity loop 10 may be connected across the mobile computing platform 18 to a relay 20 to control various system responses to attempted misappropriation. For example, attempted misappropriation might cause the ignition to be inoperable. In any event, any cut cable, and any connection removal, will be detected by hardware continuity loop 10, which will be deactivated so as to disable operability of vehicle 22.

More specifically, hardware continuity loop 10 includes a vehicle ground 12 located at one end 52 of a power cable 14 adapted to ground the hardware continuity loop 10. The power cable 14 is operatively connected across selected components 56a-n of the mobile computing platform 18. Specifically, power cable 14 is operatively connected across mobile application server 26. A second cable, referred to as a satellite data modem cable 15, is operatively connected between the mobile application server 26 and the satellite data modem 42. A relay 20 is provided for controlling vehicle response to an attempted vehicle misappropriation.

The selected components 56a-n of the mobile computing platform 18 do not include the media display unit 44. The selected components 56a-n of the mobile computing platform 18 do include the mobile application server 26. The selected components 56a-n of the mobile computing platform 18, however, include the satellite data modem 42.

Accordingly, as shown diagrammatically in FIG. 1, the hardware continuity loop 10 is routed at least twice through the satellite data modem 42. This is accomplished by routing satellite modem cable 15 least twice through the mobile application server 26. This is accomplished first by routing hardware continuity loop 10 into mobile application server 26 and exiting mobile application server 26 through the satellite modem cable 15, and second, by routing satellite modem cable 15 into mobile application server 26 to exit through accessory cable 54. Accessory cable 54 includes an accessory cable connector 58 through satellite data modem 42, and out of an umbilical (flying) set of leads 40 to a relay 20 that is connected to one of the leads 40.

The accessory cable connector 58 may be a 44-pin accessory cable connector. Typically, the ignition line will pass through relay 20 in the hardware continuity loop 10 is uninterrupted. If hardware continuity loop 10 is interrupted anywhere across hardware continuity loop 10, relay 20 will be deactivated, and the ignition of vehicle 22 disabled, rendering vehicle 22 inoperable.

Figure 2:
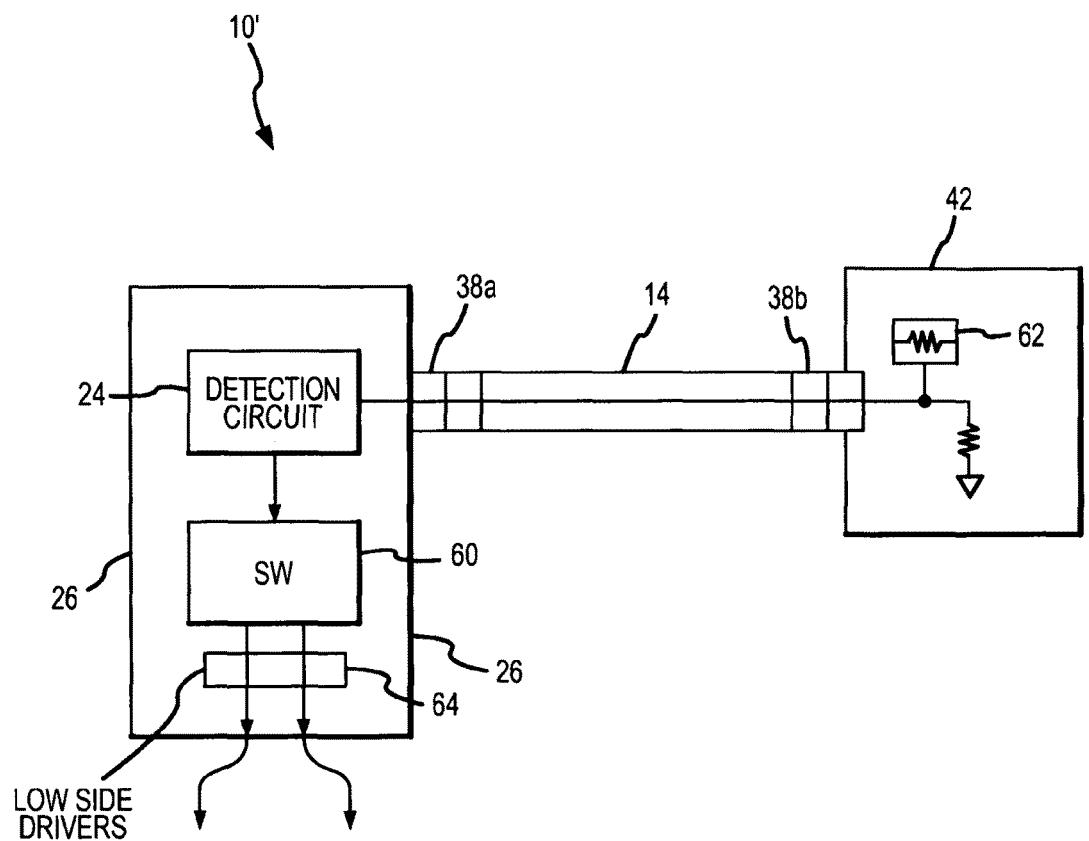
FIG. 2 is a schematic illustration of another embodiment of the hardware continuity loop in the form of a software-assisted hardware continuity loop.

An alternative embodiment of hardware continuity loop 10 illustrated diagrammatically in FIG. 2 as a software-assisted hardware continuity loop 10' for preventing vehicle misappropriation. Software-assisted hardware continuity loop 10' is operatively connected across a satellite data modem 42 and a mobile application server 26. A detection circuit 24 is located in mobile application server 26. As shown diagrammatically in FIG. 3, at least one resistor 62 is mounted in the satellite data modem 42, and is adapted to process a signal on sensing vehicle misappropriation. A plurality of programmable general purpose modules 60 is included for causing a vehicle response to attempted vehicle misappropriation, such as disabling vehicle ignition, honking a horn, causing lights to blink, and the like. In addition, a plurality of low side drivers 64 are provided to control external relays related to vehicle horns, lights, and the like.

The hardware continuity loop 10 shown in drawing FIGS. 1-4 includes at least two embodiments not intended to be exclusive, but merely illustrative of the disclosed but non-exclusive embodiments. Claim elements and steps in this document have been numbered and/or lettered solely as an aid in readability and understanding. Claim elements and steps have been numbered solely as an aid in readability and understanding. The numbering is not intended to, and should not be considered as intending to, indicate the ordering of elements and steps in the claims.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A hardware continuity loop for preventing vehicle misappropriation, comprising:
    a vehicle ground located at one end of a power cable, wherein the power cable operatively connects a subset of a plurality of components of a mobile computing platform in the form of a hardware continuity loop in order to form an uninterrupted electrical circuit, the subset of components comprising a mobile application server operatively connected between the vehicle ground and a modem via the hardware continuity loop, wherein the mobile computing platform further comprises a media display unit that is operatively connected to the mobile application server via a separate connection, such that the media display unit is not connected via the hardware continuity loop; and
    a relay for controlling vehicle response to an interruption of an electric current flowing through the continuity loop from an attempted vehicle misappropriation.

2. A hardware continuity loop as recited in claim 1, wherein the plurality of components includes one or more cable connectors.

3. A hardware continuity loop as recited in claim 2, wherein the one or more cable connectors is a 44-pin accessory cable connector.

4. A hardware continuity loop as recited in claim 3, wherein the cable connector further comprises an umbilical lead.

5. A hardware continuity loop as recited in claim 4, wherein the umbilical lead is preferably a flying lead having at least one lead operatively connected to the relay.

6. A hardware continuity loop as recited in claim 1, wherein the continuity loop routes through at least one of the subset of the plurality of components twice.

7. A hardware continuity loop as recited in claim 1, wherein the at least one component is the modem.

8. A hardware continuity loop as recited in claim 1, wherein the mobile application server comprises an internal power supply.

9. A hardware continuity loop as recited in claim 1, wherein the continuity loop forms the uninterrupted electrical circuit connected through the mobile application server to the subset of components and from the subset of components back through the mobile application server to the ground.

10. A hardware continuity loop as recited in claim 1, wherein the hardware continuity loop comprises:
    a first line that operatively connects the mobile application server between the vehicle ground and the modem; and
    a second line that operatively connects the mobile application server between the vehicle ground and the modem.

11. A software-assisted hardware continuity loop for preventing vehicle misappropriation, comprising:
    a vehicle ground;
    a mobile computing platform comprising:
        a mobile application server;
        a modem mountable on a vehicle and operatively connectable to the mobile application server via a power cable in the form of a hardware continuity loop in order to form an uninterrupted electrical circuit such that the mobile application server is operatively connected between the vehicle ground and the modem via the continuity loop; and
        a media display unit that is operatively connected to the mobile application server via a separate connection, such that the media display unit is not connected via the hardware continuity loop; and
    at least one resistor mounted in the modem;
    a detection circuit operatively connected to the at least one resistor and configured to process a signal on sensing vehicle misappropriation, wherein vehicle misappropriation is sensed in response to an interruption of an electric current flowing through the continuity loop; and
    a plurality of programmable general purpose modules configured to cause a vehicle reaction in response to the signal of attempted vehicle misappropriation.

12. A software-assisted hardware continuity loop for preventing vehicle misappropriation as recited in claim 11, wherein the detection circuit is configured to monitor the presence of the modem by monitoring connectivity of cables and cable connectors at the mobile application server.

13. A software-assisted hardware continuity loop for preventing vehicle misappropriation as recited in claim 11, wherein the detection circuit is configured to monitor connectivity of cables and cable connectors in the modem.

14. A software-assisted hardware continuity loop for preventing vehicle misappropriation as recited in claim 11, wherein one of the plurality of programmable general purpose modules is configured to operatively connect to a vehicle ignition and is configured to preclude ignition.

15. A software-assisted hardware continuity loop for preventing vehicle misappropriation as recited in claim 14, further comprising one or more low side drivers for controlling a vehicle lighting alert.

16. A software-assisted hardware continuity loop for preventing vehicle misappropriation as recited in claim 11, further comprising one or more low side drivers for controlling a vehicle horn alert.

17. A method for establishing a hardware continuity loop for prevention of vehicle misappropriation, comprising the steps of:
- selecting a plurality of cables operatively connectable across a subset of a plurality of components of a mobile computing platform the subset of components comprising a mobile application server operatively connected between a vehicle ground and a modem via a hardware continuity loop, wherein the mobile computing platform further comprises a media display unit that is operatively connected to the mobile application server via a separate connection, such that the media display unit is not connected via the hardware continuity loop;
- providing for grounding of one end of one of the cables such that the plurality of components are connected in the hardware continuity loop in order to form an uninterrupted electrical circuit; and
- including a relay at the other end of one of the cables for controlling vehicle response to an attempted vehicle misappropriation.

18. A method for establishing a software-assisted hardware continuity loop for preventing vehicle misappropriation, comprising the steps of:
- operatively connecting a subset of a plurality of components of a mobile computing platform in the form of a hardware continuity loop in order to form an uninterrupted electrical circuit, the subset of components comprising a mobile application server operatively connected between the vehicle ground and a modem via the hardware continuity loop, wherein the mobile computing platform further comprises a media display unit that is operatively connected to the mobile application server via a separate connection, such that the media display unit is not connected via the hardware continuity loop;
- installing at least one resistor in the modem;
- including a detection circuit operatively connected to the at least one resistor and configured to process a signal on sensing vehicle misappropriation, wherein vehicle misappropriation is sensed in response to an interruption of an electric current flowing through the continuity loop; and
- disposing a plurality of programmable general purpose modules for causing a vehicle response to attempted vehicle misappropriation.

\* \* \* \* \*